United States Patent Office 3,063,744
Patented Nov. 13, 1962

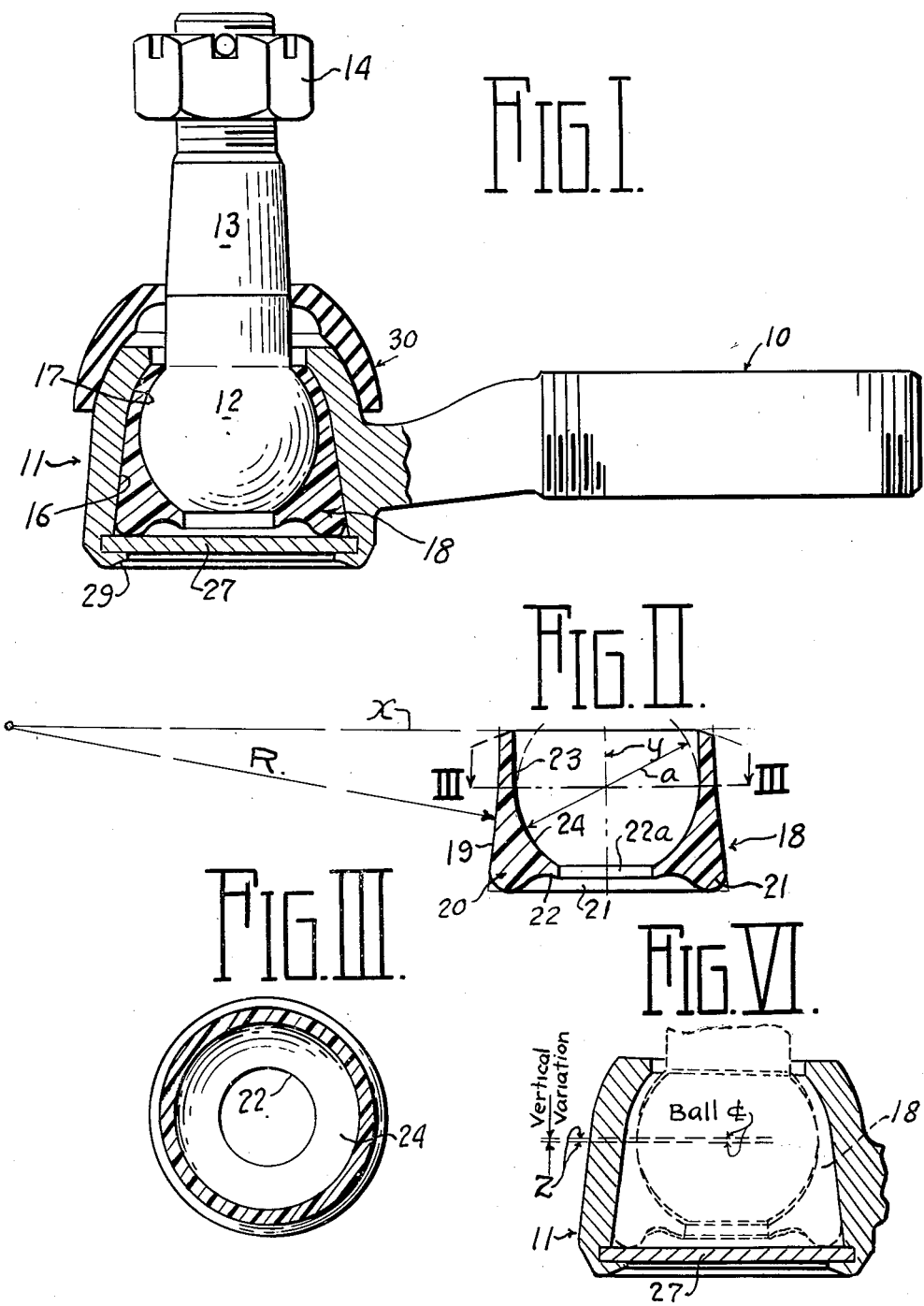

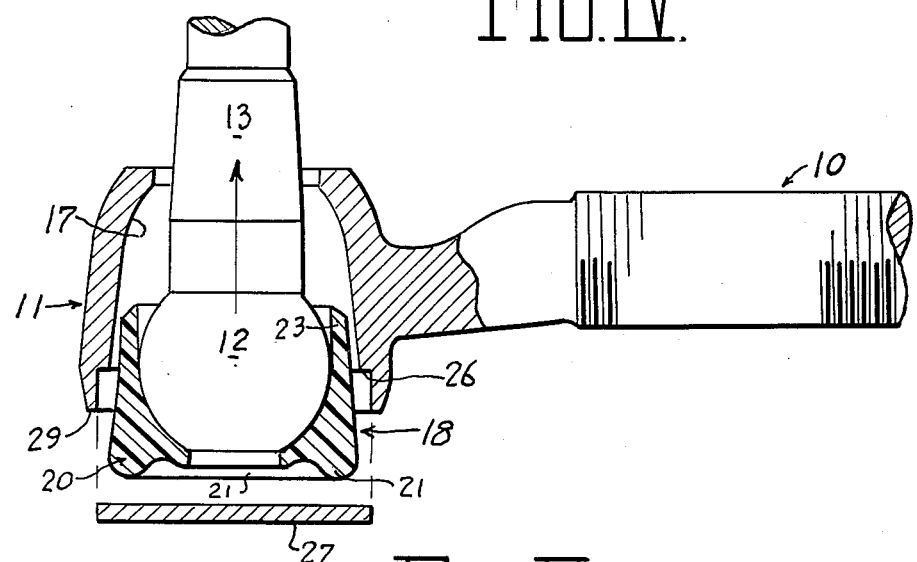
Fig. IV.
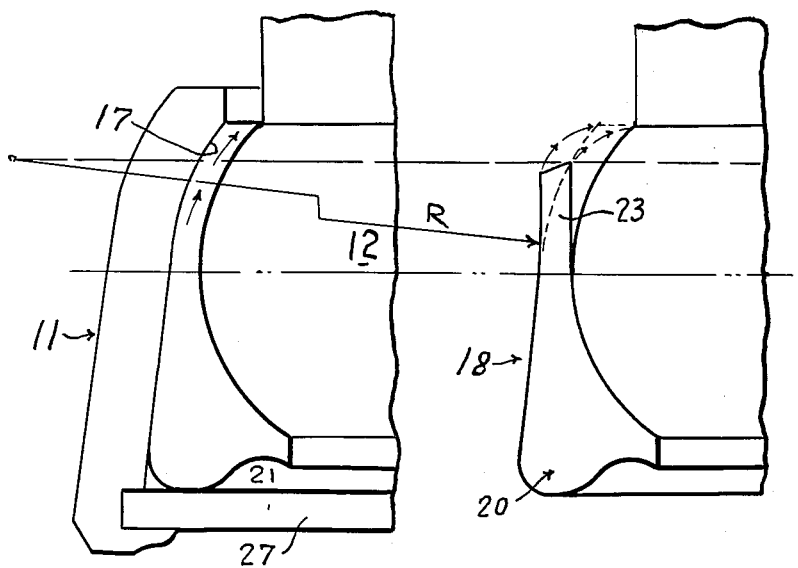
Fig. V.

3,063,744
JOINT WITH BEARING MEMBER
William A. Flumerfelt, Columbus, Ohio, assignor to The Columbus Auto Parts Company, Columbus, Ohio, a corporation of Ohio
Filed Aug. 7, 1959, Ser. No. 832,314
2 Claims. (Cl. 287—87)

This invention relates to joint constructions in which a special material is interposed between two relatively movable parts of the joint, and the specific embodiment of the present invention relates to a universal joint used in steering linkages for motor vehicles.

The object of the present invention is to provide a combination in a joint of this character, in which the bearing material will afford a permanently lubricated or greasless joint, said material having great tensile strength, is elastic, affords great resistance to wear and tear, and has a low coefficient of friction.

Moreover, it is an object of the present invention to provide in a joint of this character a bearing material which is preformed to one shape but has the capacity of permitting a change to the desired configuration in the final assembly without change in volume or interfering with the foregoing characteristics thereof and without materially modifying the inherent structure of the material.

A further object of the invention is to provide in a joint of this character a construction in which, by the special elasticity of the bearing material employed, I am able to eliminate the take up springs previously considered necessary, particularly in the type of joint illustrated herewith.

Further additional objects and advantages are within the scope of this invention such as relate to the arrangement, operation and function of the related elements of the structure, to various details of construction and to combinations of parts, further characteristics of elements per se, and to economies of manufacture and numerous other features as will be apparent from a consideration of the specification and drawings of a form of the invention, which may be preferred, in which:

FIGURE I is an elevation, partly in section, showing a ball joint assembly made according to my invention for use with a steerage linkage on an automobile;

FIGURE II is a section to the seat member of said ball joint of FIGURE I;

FIGURE III is a section taken on the line III—III of FIGURE II;

FIGURE IV is an exploded view of the parts of the ball joint shown in FIGURE I preparatory to assembly;

FIGURE V is an enlarged view of the ball joint displacement of the seat material around the ball when assembled according to the illustration of FIGURE IV;

FIGURE VI is a sectional view showing the various transverse axes which occurs in assembly of the parts due to slight variations in volume thereof.

Referring to FIGURE I, I have illustrated a standard tenon 10 connected with a ball joint housing 11, into which is placed a ball 12 having a stud 13 adapted to be connected by nut 14 to the steering arm knuckle of an automotive vehicle, for example.

In the present embodiment of my invention, I have provided the socket 11 with a frustro-conical shape of cavity in the lower portion 16 and an upper hemispherical portion 17. Interposed between the ball 12 and the socket 11, is a special seat member 18, illustrated detached from the joint in FIGURE II before assembly.

Specifically, the seat member 18 is composed of Adiprene C or Vulkollan 30, which I understand are synthetic elastomers and that such urethane rubber substances are formed of diisocyanates and polyhydroxy compounds such as linear polyesters with an additive to reduce friction. I understand such additive to be molybdenum-disulfide, or graphite or the like. This seat material 18 is a plastic synthetic tough elastic material having a great tensile strength, elasticity, resistance to wear and tear, and has a low coefficient of friction for the joint such as illustrated herein. It also has an outstanding capacity of being capable of having its configuration changed without interference with the foregoing characteristics when assembled in a mechanical joint to form an excellent anti-frictional fit between parts and with the characteristics of providing a desirable anti-friction bearing.

As shown in FIGURE II, the seat member has a frustro-conical outside surface 19, a thickened base portion, which thickened base portion has an inside spherical surface, as illustrated, and has a recessed portion 20 on the lower face thereof to form a depending annulus 21. A wall 22 of the seat material 18 is disposed within the annulus 21 between the recess and the adjacent portion of the ball 12. As identified in FIG. II, the wall 22 has an opening 22a therethrough. The upper portion of the seat 18 has a cylindrical portion 23, and the vertical length of the portion is less than the distance from the center ball to the upper portion thereof, so that the material may be made to conform closely to the ball and inside the socket wall portion 17, as will be hereinafter pointed out.

As stated supra, the lower portion of the seat 18 on the inside has a spherical configuration 24 as shown.

Referring to FIGURE IV, which illustrates the assembly of my improved construction, it will be seen that the seat member 18 is positioned around the ball 12, and since the opening in the upper part of the socket is less than the diameter of the ball stud 13, the ball and stud with the seat member 18 attached thereto, is forced upwardly from the open ended bottom of the socket 11, which may be accomplished either manually or by suitable tooling, whereupon the upper cylindrical portion 23 of the seat member is forced into a hemispherical portion without volume change. Its contact with the inner curved surface of the socket cavity 17 as shown produces the result in which the material thereof is forced upwardly, as illustrated in FIGURE V, to intimately and closely contact both the outside surface of the ball 12 and the inside surface 17 in the cavity in the socket 11.

It will be noted that I have provided a shoulder 26 in the lower part of the socket 11, so that when the ball and seat assembly is forced into the socket, as just described, a metal seat or closing member 27 may be forced against the shoulder 26 and the lower projecting edge 29 of the housing spun around the edge of said seat 27 to hold the entire joint in proper assembly. In my invention, it is desirable to place the joint parts under compression when this last sealing action is accomplished, and in this connection the elasticity of the material of the seat member 18 is sufficient to continually urge all the parts of the joint into close intimate contact, no metallic spring being necessary between the parts of the joint and the sealing seat washer 27.

The ball seat 18 is seamless and molded in uncomplicated molds and variable shrinkage and slight manufacturing variations are not important, since the seat 18 will conform to mating parts of the joint as will the member 18 itself, due to the character of the material. Being elastic it will closely conform to mating parts as stated, and provision is made in the shape of the member 18 to accommodate variations both in the part itself and in the mating metal parts. Should the cavity in the socket be undersized and the ball stud be oversized, for example, the reduced volume available for the member 18 will be compensated for by the recess inside the flange 21 in the large end of the seat 18.

The flexibility of the seat 18 will compensate for the reverse situations, where the cavity in socket 11 is oversized and the ball stud 13 undersized, closing in around the ball, providing full surface contact of the parts under varying volume conditions. I have also been able to dispense with highly precise machining of the inside of the upper parts in the socket at 17 with my present invention and have been able to reduce the machining to a simple coining with the attendant saving in metal that coining entails compared to machining.

While I do not depend on dual bearing action, dependent upon the particular friction between the seat and both ball and housing, the ball surface and inside seat surface will move relatively, or the outside seat surface, will move relatively to the inside of the housing surface, or both actions will occur.

In the drawings which are to scale, but one and one-half times full size for FIGURES I through IV, and three times for FIGURE V, I show, as stated above, that the seat member 18 is shorter than the height of the ball where it joins the stud, indicated at $b$ in the left hand part of FIGURE V. By specific comparison, section by section, I have also found that to fit as shown in the left of FIGURE V, the cylindrical shaped seat portion 23, as in the right hand part of FIGURE V, should be lessened from the line $X$ across the top of the seat portion 23 down to the equator of the ball, and by plotting the results, found that the plot came out substantially on a radius marked R, struck from a center on said line $X$ as shown. Furthermore, I found that the length of the radius R, in the example referred to, can be determined by the formula $$R = \frac{3.88a}{1.037}$$

I show at 30 a suitable dust guard.

In FIGURE VI I show a plurality of transverse axes Z, each representing one central transverse axis of a ball; this figure illustrates that with even substantial variations in tolerances and dimensions of all parts of the joint, the special material of the seat member 18, which I use, automatically adjusts the entire assembly to correct fit of all parts, notwithstanding a large number of joint constructons made in accordance with my invention.

It is apparent that within the scope of the invention, modifications and different arrangements may be made other than is herein disclosed, and the present disclosure is illustrative merely, the invention comprehending all variations thereof.

What I claim is:

1. In a ball joint, a housing member having an open ended cavity provided with a hemispherically shaped wall portion at one end thereof, a ball stud member having a ball disposed in said cavity, a unitary combined seat and take-up member interposed between said housing member and said ball, said seat having a normally substantially cylindrical portion at one end thereof held in a substantially hemispherically shaped configuration between said ball and the hemispherically shaped wall portion of said housing, the other end of said seat being centrally recessed to define an annular projecting seat portion and a recessed wall portion within said annular seat portion which is in engagement with the adjacent portion of said ball, and closure means closing the open end of said cavity engageable with said annular seat portion for holding said seat under compression in said cavity, said recessed wall portion being spaced from said closure means.

2. In a ball joint, a housing member having a cavity provided with a hemispherically shaped wall portion at one end thereof, a ball stud member having a ball disposed in said cavity, and a unitary combined seat and take-up member interposed between said housing member and said ball, said seat having a portion at one end thereof which is held in compression between said hemispherically shaped wall portion and said ball, the other end of said seat being centrally recessed to define an annular projecting seat portion and a recessed wall portion within said annular seat portion which is in engagement with the adjacent portion of said ball and means engaging said annular portion and holding said seat under compression against said ball, said recessed wall portion being spaced from said means.

References Cited in the file of this patent

UNITED STATES PATENTS

| 1,980,117 | Turner et al. | Nov. 6, 1934 |
| 1,983,947 | Rockwell | Dec. 11, 1934 |

FOREIGN PATENTS

| 877,230 | France | Sept. 1, 1942 |
| 1,010,392 | Germany | June 13, 1957 |
| 552,405 | Great Britain | Apr. 6, 1943 |
| 725,724 | Great Britain | Mar. 9, 1955 |

OTHER REFERENCES

The publication "Polyurethanes," by Bernard A. Dombrow, copyright 1957 by Reinhold Publishing Corp., New York. Copy can be found in Division 60, pages 112 and 119 relied on.